Figure 1:
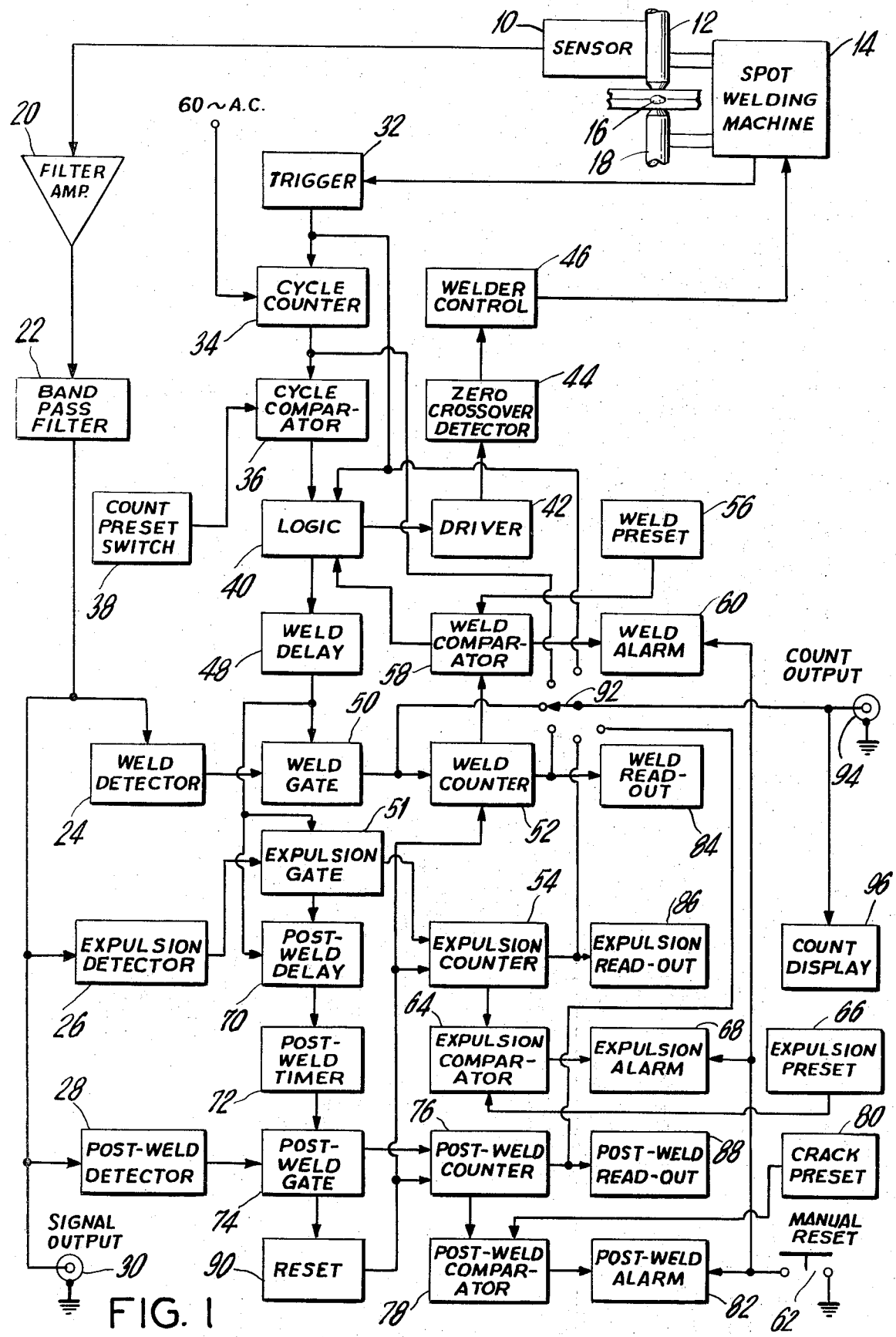

United States Patent [19]
Notvest

[11] 3,824,377
[45] July 16, 1974

[54] ACOUSTIC EMISSION SPOT WELDING CONTROLLER

[75] Inventor: Kenneth R. Notvest, Ramsey, N.J.

[73] Assignee: Trodyne Corporation, Teterboro, N.J.

[22] Filed: May 10, 1972

[21] Appl. No.: 252,111

[52] U.S. Cl........ 235/92 PD, 235/92 R, 235/92 EL, 235/92 MP
[51] Int. Cl. .......................................... H03k 21/34
[58] Field of Search ....... 235/92 QC, 92 PE, 92 PD, 235/92 FP, 92 PK

[56] References Cited
UNITED STATES PATENTS

| | | | |
|---|---|---|---|
| 2,147,918 | 2/1939 | Overbeck | 235/92 PK |
| 2,277,146 | 3/1942 | Roby | 235/92 PE |
| 2,862,114 | 11/1958 | Solomon | 235/92 PE |
| 3,614,761 | 10/1971 | Rehm | 235/92 PE |
| 3,660,972 | 5/1972 | Neill | 235/92 QC |

Primary Examiner—Paul J. Henon
Assistant Examiner—Robert F. Gnuse
Attorney, Agent, or Firm—Sandoe, Hopgood & Calimafde

[57] ABSTRACT

A system for detecting the acoustic emission emanating from a spot weld in which the emission from spot weld nugget formation, weld expulsion and post-weld cracking are separately detected and converted to binary signals. The binary signals are accumulated and compared with pre-determined count levels. Means are provided to turn off the spot welding machine when the accumulated count indicates that the spot weld nugget has reached the desired volume. Means may also be provided to activate alarm signals if the weld nugget fails to reach the desired volume, or if the weld nugget suffers excessive expulsion or post-weld cracking.

17 Claims, 3 Drawing Figures

ACOUSTIC EMISSION SPOT WELDING CONTROLLER

The present invention relates to spot welding control apparatus and, more particularly, to an acoustic emission detection system which provides real-time control of spot welding nugget volume, as well as a monitoring of spot welding expulsion and post-weld cracking.

Spot welds suffer from variations in weld nugget volume due to material variations and the deterioration of the spot welding electrodes. Expulsion of the molten weld nugget may occur due to gas formation or improper welding parameters. In addition, the spot weld may crack in varying degrees as it cools down during the post weld interval. All of the aforementioned factors tend to weaken the strength of the weld and result in an inferior welded structure. Such inferior spot welds are difficult to inspect because the spot weld is hidden at the interface of the members being joined. Thus, control of spot welding requires frequent destructive tests of sample welds in order to realize sufficient control of the spot welding process for the purpose of achieving a weld of optimum reliability and integrity.

The need thus exists for an apparatus capable of detecting the volume of a spot weld nugget during the formative welding stage, and for controlling the spot welding machine to terminate the supply of welding current when the desired spot weld nugget volume has been achieved. An additional benefit that may be derived from monitoring the spot welding process is that warning devices can be activated if the welding parameters of the welding machine are incapable of producing a proper volume of weld nugget, or if these parameters produce excess weld expulsion or post-weld cracking.

Additional control of the spot-welding procedure is possible by monitoring the nugget volume and the expulsion and post-weld cracking as changes are made in the welding parameters such as electrode force, weld current and time, post-heat and so forth. In this fashion the optimum welding parameters can be more readily established.

It has been observed that materials being spot welded produce a wave-like propagation of energy (acoustic emission). It has also been observed that acoustic emission occurs, during the time that welding current is applied, in a relatively continuous pattern, and that the energy of the acoustic emission has a direct relationship to the volume of the spot weld nugget. It has also been observed that expulsion of molten metal from the weld nugget causes large amplitude bursts of acoustic emission above the general level of acoustic emission due to weld nugget formation. Upon the termination of spot welding current, the cooling spot weld may emit acoustic energy arising from metallurgical changes in the cooling weld such as phase transformations and dislocation pile up and collapse. It has also been observed that internal stresses in the cooling weld may cause the weld to crack. Such cracking occurs in increments, and each crack increment results in the generation of acoustic emission. The energy of the acoustic emission is of varying amplitude, corresponding to the magnitude of the crack increment.

It is an object of this invention to provide an instrument which reliably and accurately indicates the acoustic emission detected from spot welding processes.

It is a further object of this invention to provide an acoustic emission detection instrument which is able to discriminate among acoustic emissions arising from weld nugget formation, weld metal expulsion, post weld metallurgical phenomena, and post-weld cracking.

It is another object of this invention to provide means to control termination of the spot welding current when a desired spot weld nugget has been achieved.

It is yet a further object of the present invention to provide suitable digital read-outs relative to spot weld nugget volume, weld expulsion and post-weld cracking, and to provide an indication of insufficient weld volumes, excessive expulsion, and escessive post-weld cracking.

To these ends, the acoustic emission monitoring and control instrument of the invention comprises means for detecting the acoustic emission resulting from spot welding, and for thereafter separating the acoustic emission that arises from the various welding phenomena into discrete channels for independent processing. The acoustic emission signals are distinguished and separated by means of temporal and magnitude considerations. The detected acoustic emissions are converted to binary count signals which are representative of the spot welding phenomena being detected. The binary count signals are accumulated to provide a real-time indication of nugget volume, weld expulsion, post-weld transformation and post-weld cracking.

Whenever external factors cause the weld current to be terminated before the spot weld has achieved the desired volume, an indicator is activated to thereby automatically provide a warning signal. Whenever the accumulated nugget volume signals equal a predetermined level, a signal is provided to automatically shut off the welding current of the spot welding machine.

The acoustic emission sensor is herein shown as a piezo-electric element mechanically attached to one electrode of the spot welding machine or to the workpiece being welded. The signal produced by that element upon the start of the welding cycle, or other acoustic energy, is amplified and caused to pass through a filter which filters out normal vibration and acoustic noise. The amplified signal is then applied to a plurality of level detectors, each with its unique adjustable reference level. The acoustic emission signals are processed with respect to predetermined levels and separated to derive different binary signals which are thereafter sampled on a time basis relative to the welding cycle.

In another aspect of the invention, means are provided to sense the duration of welding current in the spot welding machine. This signal is processed to provide suitable binary signals relating to the duration of the welding current and a presetable post-weld time period. These signals are used to gate open the binary count from the appropriate level detectors for accumulation and comparison. The respective comparisons in turn provide binary signals to terminate the welding current and activate warning indicators in the event of a faulty weld.

Figure 2:
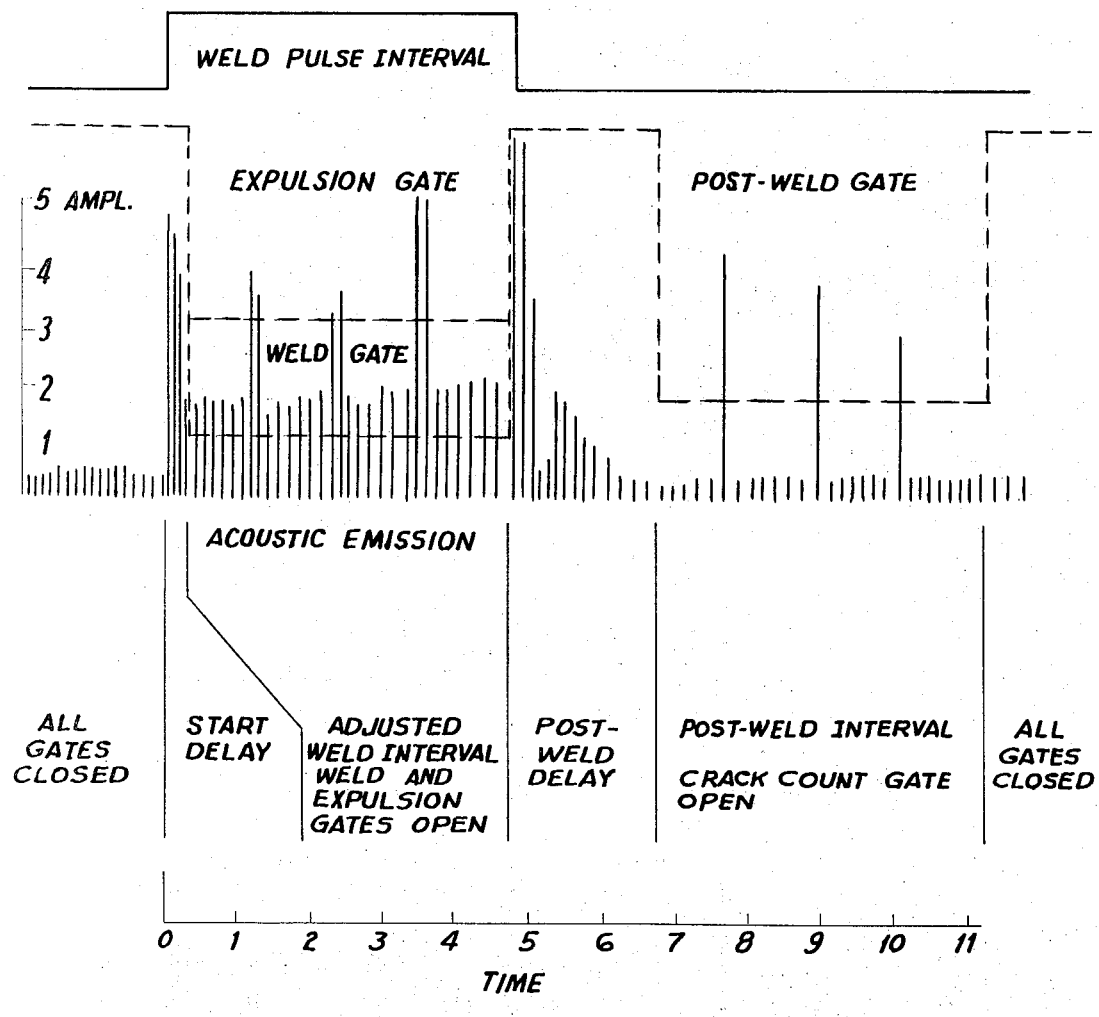
Figure 3:
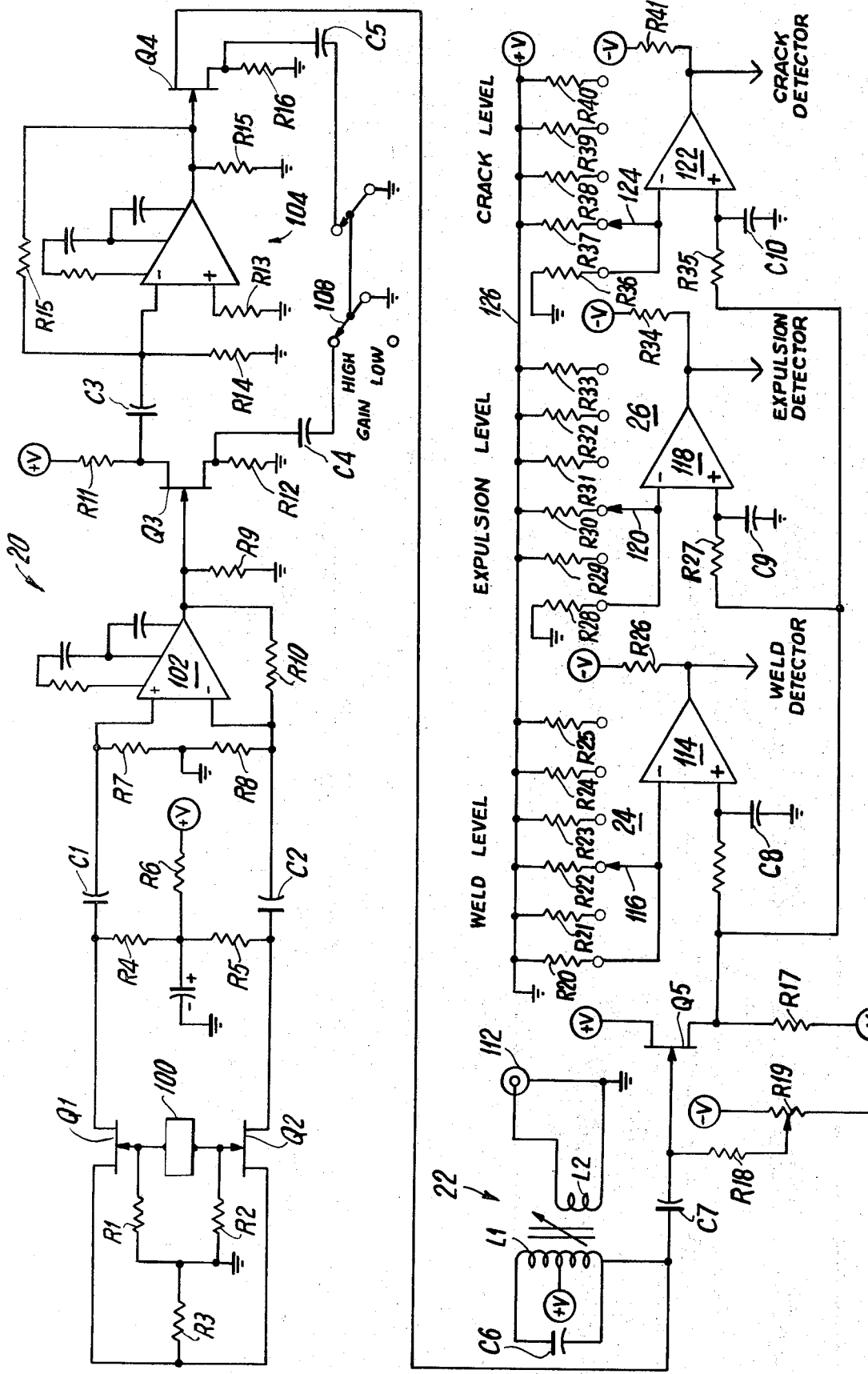

To the accomplishment of the above, and to such further objects as may hereinafter appear, the present invention relates to an acoustic emission adaptive spot weld controller substantially as defined in the appended claims, and as described in the following specification taken in connection with the accompanying drawings in which:

FIG. 1 is a schematic block diagram of the acoustic emission adaptive spot weld controller of the invention;

FIG. 2 is a waveform diagram of the acoustic energy produced during a spot welding process shown in relation to the time and events associated with the spot welding cycle for illustrating the basis for discriminating between acoustic emission from both desired and undesired phenomena associated with spot welding; and FIG. 3 is a schematic diagram in more detailed form of a portion of the block diagram of FIG. 1.

The acoustic emission detection instrument illustrated in the drawings has the capability of detecting and distinguishing among the various modes of acoustic emission emanating from a spot welding process. These emissions are distinguished from one another and are converted to binary form representative of the quantity of each acoustic emission mode. The stored binary data can be employed to terminate the welding current and activate alarm signals when the stored data equals a predetermined level. Means may be provided for reading out the stored data as an aid in establishing the welding control parameters to achieve an optimum spot weld.

Referring to FIG. 1, the weld monitoring and control instrument, according to one embodiment of the invention illustrated therein, comprises an acoustic emission sensor in the form of a piezo-electric transducer 10, such as an 800 kHz resonant frequency ceramic piezo. Transducer 10 is mounted in a relatively massive holder that is adapted to be clamped to one electrode 12 of the spot welding machine 14 or to the workpiece being welded in a manner such that the transducer 10 is sensitive to shear waves that may occur in electrode 12 (or the workpiece) such as a result of acoustic emission from a spot weld 16 being transmitted through the welding electrode 12 and a second electrode 18 of welding machine 14.

The electronic signals produced by transducer 10, as a result of the release of acoustic emission through electrode 12 or the workpiece, are coupled to a preamplifier 20 which is preferably integral with, and mounted within, the shielding case of the transducer. Coupling of the piezo signals is differential into preamplifier 20 and the output signals from the preamplifier are differential and of low impedance for transmission to the following stages of the instrument. The coupling of signals in this manner serves to reject common mode spurious signals.

The amplified signals from pre-amplifier 20 are coupled to an active filter 22 which includes a band pass filter for passing signals at frequencies centered about the mounted resonant frequency of the transducer, to thereby improve the signal to noise ratio. The amplified signal at the single ended output of filter 22 is an analog signal that is coupled to a plurality of level detectors 24, 26 and 28 and an external output jack 30. Level detectors 24, 26 and 28 detect the number of oscillations of the analog acoustic emission signal above a reference level voltage that is independently adjustable for each of the detectors. The outputs of detectors 24, 26 and 28 are binary signals proprotional to the magnitude of the analog acoustic emission signal that exceeds the reference detection levels. The reference level of level detector 24 is preset empirically to eliminate output counts due to noise signals. The reference voltage of level detector 26 is set at an empirically established level above the level of the acoustic emission due to welding coalescence in order to detect only the more energetic emissions due to weld expulsion, and the reference voltage of level detector 28 is set at an empirically established level to detect acoustic emission due to cracking above the level of emission due to metallurgical changes and background noise in a manner described more completely below with respect to FIG. 3. The outputs of the level detectors are normally inhibited and gated open and coupled to counters at suitable intervals during the welding cycle.

The instrument of FIG. 1 is further provided with means to sense the initiation of welding current in spot welding machine 14. This sensing is accomplished by a trigger circuit 32 coupled to machine 14. Trigger circuit 32 activates a cycle counting circuit 34 that receives and counts the 60 ~ line voltage oscillations, a time base that is commonly used in spot welding. A cycle comparator circuit 36 coupled to cycle counting circuit 34 compares the number of line voltage oscillations against a pre-determined count furnished by a count preset switch 38. When the number of the compared signals are equal, comparator 36 provides a termination pulse to a logic circuit 40, which in turn provides a turn on pulse to a driver 42 and to a zero crossing detector 44. The latter in turn activates a welder control circuit 46 to welding machine 14 when the line voltage is zero.

Expulsion acoustic emission may result during a spot welding operation as a result of sparking during the creation of the welding arc. The acoustic emission signals that are produced by sparking are far less frequent than those produced by the desired welding operation, but are of a significantly higher amplitude. Weld and expulsion detectors 24 and 26 have their reference levels established as noted above so that the former produces binary signals proportional only to the weld acoustic emission signals, and the latter produces binary signals proportional only to the expulsion acoustic emission signals. FIG. 2 illustrates the relative amplitudes and time relationships of the weld, expulsion, and post-weld acoustic emission signals, as well as that of the weld gate, expulsion gate, and post-weld gate, as shown in the broken lines in FIG. 2 and developed and employed in the gating circuits as described below.

Another output of logic circuit 40 is coupled to a delay circuit 48 which delays the coupling of the weld interval signal to the counting circuits for 5 milliseconds. This delay keeps the counting circuits inhibited during the weld current turn-on interval when transient signals due to switching on of the welder are prevalent. The delayed output of logic circuit 48 is coupled to a weld gate 50 and to an expulsion gate 51. Gate 50, which is enabled only during the once-delayed or normalized weld interval, couples the output of weld detector 24 to weld counter 52. The output of expulsion detector 26 is coupled through gate 51, which is also enabled during the normalized weld interval to an expulsion counter 54 during that interval.

The weld count accumulated in weld counter 52 is compared to a binary coded decimal count preset into a weld comparator 56 by a weld preset switch 58. When the compared counts are equal, a weld terminate pulse is coupled to logic circuit 48, causing the driver 42 to turn off the welding machine at the next zero crossing of the AC line voltage. In the event that the weld cannot be made in the interval allowed by cycle counter 34, that is, if the number of counted weld signals in weld counter 52 is less than the preset count obtained from switch 58, weld comparator 56 couples a signal to a weld alarm 60 which remains on until manually reset by means of a manual reset 62.

The expulsion count accumulating in expulsion counter 54 is compared to a binary coded decimal count programmed into an expulsion comparator 64 from an expulsion preset switch 66. Should the expulsion count exceed the preprogrammed count, a signal is produced in comparator 64 coupled to an expulsion alarm 68 which remains on until it is manually reset by switch 62.

The termination of the weld pulse actuates a delay circuit 70 which delays the start of the post weld interval to permit weld turn off transient signals and undesired acoustic emission due to metallurgical phase changes to remain uncounted. The output of delay circuit 70 is coupled to a variable post weld timer 72 which in turn opens a post weld gate 74. Gate 72 couples the binary count derived from post weld detector 28 to a post weld counter 76. The cracking count accumulating in post weld counter 76 is compared to a binary coded decimal count preset into a post weld comparator 78 from a cracking preset switch 80. Should the cracking count in counter 76 exceed the pre-set count, a signal produced by comparator 78 coupled to a post weld alarm 82 actuates that alarm which remains on until it is manually reset.

The counts accumulated in the aforementioned counters 52, 54, and 76 are respectively coupled to readouts 84, 86, and 88 in a binary coded decimal format. The termination of the readout command pulse activates a counter reset circuit 90, the output of which is coupled to all counting circuits 52, 54 and 76 to reset these stored counts to zero. The outputs of these counters is also selectively applied through a switch 92 to a count output terminal 94 and a count display 96.

A more detailed schematic diagram of a portion of the weld control and monitoring system of FIG. 1 is shown in FIG. 3; the design of the remaining circuits of the system is believed to be well within the skill of those in the art and is thus not further described herein.

As shown in FIG. 3, the transducer 10 is in the form of a piezo-electric crystal 100 having one surface electrically connected to the gate of a field effect transistors (FET) Q1, and its other surface electrically connected to the gate of an FET Q2. The gates and sources of FETs Q1 and Q2 are respectively connected to ground through resistors R1, R2 and R3.

The drains of FETs Q1 and Q2 are respectively coupled through capacitors C1 and C2 to the plus and minus inputs of a differential amplifier 102, and through resistors R4, R5 and R6 to a positive voltage source +V. The inputs to amplifier 102 are connected to ground through resistors R7 and R8.

The output of amplifier 102 is coupled to ground through a resistor R9, to the minus input terminal of that amplifier, through a resistor R10, and to the gate of an FET Q3. The source of FET Q3 is connected to the positive voltage source +V through a resistor R11 and through a capacitor Q3 to the minus input of a differential amplifier 104. The drain of FET Q3 is connected to ground through a resistor R12 and through a capacitor C4 and one contact 108 of a gain control switch S. The circuitry thus far described comprises the pre-amplifier designated 20 in the block diagram of FIG. 1.

The plus input of amplifier 104 is connected to ground through a resistor R13, and the minus input of that amplifier is connected to ground through a resistor R14 and to the output of the amplifier through a feedback resistor R15. The output of amplifier 104 is also connected to ground through a resistor R15 and to the gate of an FET Q4. The drain of the latter is connected through a resistor R16, and through a capacitor C5 and a second contact 110 of switch S to ground.

The source of FET Q4 is connected to a parallel tuned resonant comprising an inductance L1 and a capacitor C6. A center tap of inductance L1 is connected to voltage source V. Inductance L1 is inductively coupled to a winding L2 to an output terminal 112 at which the amplified acoustic emission signal can be viewed such as on an oscilloscope.

The source of FET Q4 is also coupled through a capacitor C7 to the gate of an FET Q5. The source of that transistor is connected to a positive voltage and its drain is connected through a resistor R17 to a negative voltage. The gate is also coupled to a biasing source including a fixed resistor R18 and a variable resistor R19 coupled between a negative voltage source and ground. The output signal at the drain of FET Q9 is the acoustic emission analog signal that is applied to weld detector 24, expulsion detector 26, and post-weld or crack detector 28 as described above.

As shown more specifically in FIG. 3, weld detector 24 includes a differential amplifier 114, which has a plus input coupled to the drain of FET Q5 and to ground through a capacitor C8. The minus input of amplifier 114 is connected through a resistor R20 to ground and to one of a group of reference level resistors R21–R25 through a switchable contact 116. The output of amplifier 114 is connected through a resistor R26 to a negative voltage, and to one input of gate 50 as shown in FIG. 1.

Similarly, expulsion detector 26 includes a differential amplifier 118 having a plus input coupled to the drain of FET Q5 through a resistor R27 and to ground through a capacitor C9, and a minus input coupled to ground through a resistor R28 and to one of a group of reference-level setting resistors R29–R33 through a switchable contact 120. The output of amplifer 118 is connected to a negative voltage through a resistor R34 and to the other input of gate 50 as shown in FIG. 1.

Post weld detector 28 includes a differential amplifier 122 having a plus input coupled to FET Q5 through a resistor R35 and to ground through a capacitor C10. The minus input of amplifier 122 is connected to ground through a resistor R36 and to one of a group of reference-level setting resistors R37–R40 through a switchable contact 124. The output of amplifier 122 is connected to a negative voltage through a resistor R41 and to post weld gate 68 as shown in FIG. 1.

One end of resistors R21–R25, R29–R33, and R37–R40 are all connected to a line 126, which is in turn connected to a positive voltage. Thus, by presetting contacts 116, 120, and 124 to make respective contact with one of these reference-level setting resistors, the desired reference or threshold level is established at the differential amplifiers of detectors 24, 26 and 28 respectively, as explained above with reference to FIG. 1.

Tests performed on one practical embodiment of the instrument have indicated a substantially linear relation between the spot weld volume and the readout of the weld counter 52 and a proportional relationship to the shear strength of the spot weld.

It will be appreciated that the spot welding adaptive control and monitoring instrument of the invention can be used to great advantage in the control of a spot welding process. Spot weld nugget volume can be more closely controlled resulting in an improved reliability of the structure being joined. The alarm provisions of the invention call attention to faulty welds and the need for maintenance. In this manner quality spot welds are assured without the requirement of periodically taking welding samples for destructive testing.

While the readout device is herein shown as an external digital printer, a visual numeric readout device such as a light emitting diode display could be employed to equal advantage.

Means are provided to operate the instrument in monitoring or adaptive control modes. In the monitor mode the weld pulse is always determined by cycle counter 34. Thus the instrument can be used to evaluate a series of test welds with controlled weld intervals. The resulting weld count can be compared with the dimensional size of the spot weld and a determining count can be selected as the basis of the desired weld properties. With the pre-determined count switched into weld preset 56 and the instrument switched to the control mode, succeeding welds will be controlled by the acoustic emission weld count.

Thus the instrument of the invention can control spot weld nugget volume in spite of variations in welding current, surface cleanliness, or the material resistance of the members being joined by spot welding.

While the invention has been herein specifically described with respect to only a single embodiment, it will be apparent that variations may be made therein all without departing from the spirit and scope of the invention.

I claim:

1. An apparatus for controlling a welding operation comprising means located adjacent a weld zone for sensing the acoustic emission energy emitted from the weld zone during a welding operation, means coupled to said sensing means for determining the magnitude of the acoustic emission, means coupled to said acoustic emission magnitude determining means for terminating the weld operation upon the sensing of a predetermined value of emitted acoustic energy, and means coupled to said acoustic energy sensing means for producing a series of count signals corresponding to the sensed acoustic emission energy, said magnitude determining means including means coupled to said signal producing means for determining the number of said count signals, said terminating means comprising means coupled to said number determining means for producing a weld termination signal upon the determination of a predetermined number of said count signals.

2. The apparatus of claim 1, in which said sensing means comprises transducer means for converting the acoustic emission energy from said weld zone to an analog electric signal, said signal producing means comprising means for comparing the level of said analog signal and a reference level and for producing one of said discrete signals whenever the former bears a predetermined relationship to the latter.

3. The apparatus of claim 2, in which said determining means comprises a counter coupled to said comparing means, said terminating means further comprising second means for comparing the signal count of said counter and a preset count and for producing said weld termination signal when said signal count bears a predetermined relation to said preset count.

4. The apparatus of claim 3, further comprising a source of a weld interval pulse, weld control means, and logic means coupled to said second comparing means for applying one of said weld interval pulse and said weld termination signal to said weld control means.

5. The apparatus of claim 4, further comprising third means coupled to said sensing means for comparing said analog signal against a second reference level greater than said first-mentioned reference level during said weld interval and for producing a second series of discrete signals whenever the former exceeds the latter, a second counter coupled to said third comparing means for counting the number of said second discrete signals during the duration of said weld operation, fourth means coupled to said counter means for comparing the number of said second discrete signals against a second predetermined number, and indicator means coupled to said fourth comparing means, the latter being effective to actuate said indicator means when the number of said second discrete signals equals or excees said second predetermined number.

6. The apparatus of claim 5, further comprising fifth means for comparing said analog signal against a third reference level at a time delayed from said weld interval and for producing a third series of discrete signals, a third counter, gating means interposed between said fifth comparing means and said third counter for passing said third series of descrete signals to said third counter after the termination of said weld interval, sixth means coupled to said third counter for comparing the number of said third discrete signals counted in said third counter and a third predetermined number, and second indicator means coupled to said sixth comparing means, the latter being effective to actuate said second indicator means when the count of said third discrete signals equals or exceeds said third predetermined number.

7. The apparatus of claim 1, further comprising means including said sensing means for monitoring the expulsion activity that occurs during said welding operation, indicating means, and means coupled between said sensing means and said indicating means for actuating the latter whenever said sensed expulsion actively exceeds a predetermined level.

8. The apparatus of claim 7, further comprising means including said sensing means for monitoring the post weld cracking activity in said weld zone following the termination of said welding operation, second indicating means, and means coupled between said sensing means and said second indicating means for actuating the latter when the sensed post weld cracking exceeds a predetermined level.

9. The apparatus of claim 1, further comprising means including said sensing means for monitoring the post weld cracking activity in said weld zone following the termination of said welding operation, indicating means, and means coupled between said sensing means and said indicating means for actuating the latter when the sensed post weld cracking exceeds a predetermined level.

10. Apparatus for monitoring the nugget coalescence, weld expulsion and post weld cracking in a weld operation, said apparatus comprising means for detecting acoustic emission from the weld and for deriving corresponding acoustic emission signals, means coupled to said detecting means for distinguishing between the acoustic emission signals produced respectively by nugget coalescence, weld expulsion and post weld cracking and for respectively separating said acoustic emission signals into first, second and third weld characteristic signals, and means coupled to said signal distinguishing and separating means for producing first, second and third count signals corresponding respectively to said first, second, and third weld characteristic signals.

11. The apparatus of claim 10, in which the number of said first, second and third count signals each bear a predetermined relationship to the magnitude of the analog signals produced by the nugget coalescence, weld expulsion, and post weld cracking.

12. The apparatus of claim 11, further comprising means for respectively gating said first, second and third count signals into first, second and third digital counters.

13. The apparatus of claim 12, further comprising means for respectively comparing the accumulated count in said first, second and third counters against first, second and third predetermined counts, and means for producing logic signals when the accumulated counts in said first, second and third counters equals or exceeds the corresponding one of said first, second and third predetermined counts.

14. The apparatus of claim 13, further comprising means coupled to said first comparing means for terminating the welding process when the count in said first counter equals said first predetermined count.

15. The apparatus of claim 15, further comprising means of producing an alarm signal if the count in said first counter does not reach said first predetermined count during the welding cycle.

16. The apparatus of claim 15, further comprising means for producing a second alarm signal if the count value in said second counter exceeds said second predetermined count value during the welding cycle.

17. The apparatus of claim 10, in which said detecting means comprises a piezo-electric element mounted on the welding apparatus, and further comprising a differential field effect transistor amplifier having first and second inputs respectively coupled to the major surfaces of said crystal for providing a differential output having a preselected impedance.

* * * * *